Patented July 6, 1943

2,323,313

UNITED STATES PATENT OFFICE 2,323,313

SYNTHETIC RUBBERLIKE LATICES

Ingofroh Dennstedt, Cologne-Buchforst, Germany, assignor, by mesne assignments, to Jasco, Incorporated, a corporation of Louisiana No Drawing. Application March 11, 1939, Serial No. 261,347. In Germany February 26, 1938

4 Claims. (Cl. 260—32)

The present invention relates to synthetic latex-like emulsions prepared by the emulsion polymerization of butadienes-1.3.

Synthetic rubber-like materials are usually prepared by the emulsion polymerization of butadienes-1.3, preferably in the presence of other polymerizable compounds such as styrene or acrylic acid nitrile, the polymeric products being obtained in the form of latex-like emulsions. On the addition of a coagulating agent the polymerization products are obtained in a solid state. It is known that polymerics of the character described show the undesirable property of becoming insoluble and losing their plasticity on storing, thereby impairing their capability of being worked and the mechanical properties of the vulcanizates. These disadvantages have been overcome by incorporating within the polymerizates so-called "antioxidants" such as phenyl-β-naphthylamine, dibenzylnaphthylamines and alkyl phenol mono- or disulfides. These antioxidants are preferably incorporated within the polymerizate while still being in the latex-state and are precipitated together with the polymerizates on coagulation. Antioxidants of the character described are insoluble in water and capable of being homogenously distributed within the polymerizate. They exert an excellent stabilizing effect on the precipitated product so that they can be stored for an indefinite period of time without undergoing any remarkable change. However, auxiliary agents of the character described have no or scarcely no stabilizing effect on the emulsions even in case of their being incorporated therewith prior to coagulation. In consequence thereof, latex-like emulsions of the character described cannot be stored without involving the danger of the properties of the unvulcanized as well as of the vulcanized products being impaired. As it is to an ever increasing extent that rubber is employed in the latex-state, the stabilizing of such synthetic latices is a grave problem in the rubber industry.

I have now found that water soluble compounds having a reducing action represent excellent stabilizers for the purpose in question. I am aware of the fact that, in accordance with the U. S. Patent No. 1,860,681 to Martin Luther et al. such compounds have already been incorporated within synthetic latices for the purpose of destroying the excess hydrogen peroxide in case this compound has been employed as polymerization accelerator. It is stated in the said patent that "no considerable excess of the reducing agent should finally be present." It follows therefrom that Martin Luther et al. have employed their reducing agents only in an amount necessary for effecting decomposition of the hydrogen peroxide or similar materials, and did not recognize the necessity of protecting such latices against the attack of oxygen beyond the stage of the decomposition of the peroxides. Moreover, as follows from the corresponding German Patent 543,152, the patentees have put such reducing agents on the same level as those stabilizing agents which are added to the solid synthetic rubber-like materials.

Now, in accordance with applicant's invention synthetic rubber-like latices are provided with water-soluble reducing agents in such an amount that they are still to be traced even after the decomposition of the peroxides, and with water insoluble stabilizing agents which are capable of being homogeneously incorporated within the polymeric products. I wish it to be understood that the water soluble reducing agents will have to be added to the latices prior to storing, whereas the latter products must be incorporated therewith in any suitable stage prior to precipitation. At any rate, latices which have been stabilized in accordance with my invention are capable of being stored for an indefinite period of time without showing any remarkable decrease of the plasticity and solubility of the polymerizate after coagulation and of the mechanical properties after vulcanization.

Suitable water-soluble reducing agents are, for instance, alkali metal hydrosulfites, hydroquinone, hydrogen sulfide and the alkali metal salts thereof, linoleic acid, ferrous salts and alkali metal formaldehyde sulfoxylates. As a matter of fact, the conditions of working and the nature of the reducing agents must be so chosen that they are not precipitated; thus, ferrous salts cannot be employed in an alkaline medium. As to the water-insoluble antioxidants I refer to the prior applications Serial No. 181,604 filed December 24, 1937, to Harro Hagen et al. and Serial No. 229,326 filed September 10, 1938, to Hans Murke et al. which disclose the use of sulfides of alkylated phenols and of N-aralkyl naphthylamines. Furthermore, there can be employed pure aromatic amines such as phenyl-β-naphthylamine. My new invention can be applied to every emulsion polymerizate of butadienes-1.3 regardless as to whether the butadienes have been polymerized alone or have been subjected to co-polymerization with vinyl compounds. Examples for suitable butadienes are butadiene itself, methyl substituted butadienes such as isoprene or dimethylbutadiene. Examples for vinyl compounds are styrene, acrylic acid nitrile, vinyl methyl ketone and the like.

The following examples illustrate the present invention without, however, restricting it thereto the parts being by weight:

EXAMPLE 1

A latex-like emulsion of a mixed polymerizate of 25 parts of acrylic acid nitrile and 75 parts of butadiene containing 3% of phenyl-β-naphthylamine as antioxidant has been divided into three parts:

Sample A has been worked up immediately after polymerization

Sample B has been stored at room temperature for 14 days,

Within Sample C there has been incorporated 1% of sodium hydrosulfite (calculated on the amount of rubber) and the whole has been stored for 14 days like part B.

On working up and vulcanization samples A, B and C showed the following figures:

|   | Tensile strength | Elongation | Modulus at an elongation of 300% | Elasticity | Hardness in degree shore |
|---|---|---|---|---|---|
|   | $Kg./cm.^2$ | Per cent | $Kg./cm.^2$ | Per cent |   |
| A | 285 | 670 | 65 | 37 | 71 |
| B | 306 | 570 | 116 | 33 | 75 |
| C | 304 | 700 | 71 | 37 | 71 |

From the decreased elongation and elasticity and the increased modulus and hardness it follows that Sample B (i. e. the product which has been stored without a stabilizer) has been deteriorated, whereas Sample C, i. e. the product which has been stored with a reducing agent shows the same properties as Sample A which has been worked up without delay.

EXAMPLE 2

A latex-like emulsion of a mixed polymerizate of 25 parts of acrylic acid nitrile and 75 parts of butadiene (as described in Example 1) containing 3% of phenyl-β-naphthylamine as antioxidant has been divided into three parts:

Sample A has been worked up immediately after polymerization,

Sample B has been stored at room temperature for 14 days,

Within Sample C there have been incorporated as stabilizers:

1% of hydroquinone (calculated on the amount of rubber)

1.5% of hydrogen sulfide (calculated on the amount of rubber)

1.2% of ferrous sulfate (calculated on the amount of rubber)

and the whole has been stored for 14 days like part B.

On working up and vulcanization Samples A, B and C showed the following figures:

*Hydroquinone (1%)*

|   | Tensile strength | Elongation | Modulus at an elongation of 300% | Elasticity | Hardness in degree shore |
|---|---|---|---|---|---|
|   | $Kg./cm.^2$ | Per cent | $Kg./cm.^2$ | Per cent |   |
| A | 288 | 780 | 63 | 38 | 71 |
| B | 277 | 520 | 136 | 33 | 77 |
| C | 309 | 725 | 77 | 39 | 71 |

*Hydrogen sulfide (1.5%)*

|   | Tensile strength | Elongation | Modulus at an elongation of 300% | Elasticity | Hardness in degree shore |
|---|---|---|---|---|---|
|   | $Kg./cm.^2$ | Per cent | $Kg./cm.^2$ | Per cent |   |
| A | 313 | 750 | 51 | 34 | 71 |
| B | 309 | 620 | 90 | 30 | 75 |
| C | 300 | 730 | 51 | 34 | 71 |

*Ferrous sulfate (1.2%)*

|   | Tensile strength | Elongation | Modulus at an elongation of 300% | Elasticity | Hardness in degree shore |
|---|---|---|---|---|---|
|   | $Kg./cm.^2$ | Per cent | $Kg./cm.^2$ | Per cent |   |
| A | 313 | 750 | 51 | 34 | 71 |
| B | 309 | 620 | 94 | 30 | 75 |
| C | 300 | 730 | 60 | 34 | 71 |

EXAMPLE 3

A latex-like emulsion of a mixed polymerizate of 25 parts of styrene and 75 parts of butadiene containing 3% of phenyl-β-naphthylamine as antioxidant has been divided into three parts:

Sample A has been worked up immediately after polymerization,

Sample B has been stored at room temperature for 14 days,

Within sample C there has been incorporated 1% of linoleic acid (calculated in the amount of rubber) and the whole has been stored for 14 days like part B.

On working up and vulcanization samples A, B and C showed the following figures:

|   | Tensile strength | Elongation | Modulus at an elongation of 300% | Elasticity | Hardness in degree shore |
|---|---|---|---|---|---|
|   | $Kg./cm.^2$ | Per cent | $Kg./cm.^2$ | Per cent |   |
| A | 277 | 590 | 91 | 49 | 72 |
| B | 275 | 510 | 156 | 50 | 75 |
| C | 260 | 555 | 99 | 49 | 73 |

From the decreased elongation and the increased modulus and hardness it follows that sample B (i. e. the product which has been stored without a stabilizer) has been deteriorated, whereas sample C, i. e. the product which has been stored with a reducing agent shows the same properties as sample A which has been worked up without delay.

I claim:

1. The process which comprises polymerizing butadienes-1,3 in aqueous emulsion in the presence of peroxides, incorporating within the emulsion immediately upon completion of the polymerization a water-insoluble anti-oxidant selected from the group consisting of phenyl-β-naphthylamine, dibenzyl naphthylamines and alkyl phenol mono- and disulfides and a water-soluble reducing agent selected from the group consisting of alkali metal hydrosulfites, hydroquinone, hydrogen sulfide and the alkali metal salts thereof, linoleic acid, ferrous salts and alkali metal formaldehyde sulfoxylates in such amount that they are still to be traced after decomposition of the peroxides and then storing the emulsion.

2. The process which comprises polymerizing butadienes-1,3 and other copolymerizable compounds in aqueous emulsion in the presence of peroxides, incorporating within the emulsion immediately upon completion of the polymerization a water-insoluble anti-oxidant selected from the group consisting of phenyl-β-naphthylamine, dibenzyl naphthylamines and alkyl phenol mono- and disulfides and a water-soluble reducing agent selected from the group consisting of alkali metal hydrosulfites, hydroquinone, hydrogen sulfide and the alkali metal salts thereof, linoleic acid, ferrous salts and alkali metal formaldehyde sulfoxylates in such amount that they are still to be traced after decomposition of the peroxides and then storing the emulsion.

3. The process as defined in claim 1 wherein the water-soluble reducing agent is sodium hydrosulfite.

4. The process as defined in claim 1 wherein the water-insoluble anti-oxidant is phenyl-$\beta$-naphthylamine and the water-soluble reducing agent is hydroquinone.

INGOFROH DENNSTEDT.